Jan. 29, 1974  D. G. ROHRBAUGH  3,788,815

CHEMICAL SAMPLE REACTOR MODULE

Filed March 2, 1972  3 Sheets-Sheet 1

Jan. 29, 1974　　　D. G. ROHRBAUGH　　　3,788,815
CHEMICAL SAMPLE REACTOR MODULE

Filed March 2, 1972　　　　　　　　　　　　　　3 Sheets-Sheet 3

United States Patent Office 3,788,815
Patented Jan. 29, 1974

3,788,815
CHEMICAL SAMPLE REACTOR MODULE
Donald G. Rohrbaugh, Santa Ana, Calif., assignor to Beckman Instruments, Inc.
Filed Mar. 2, 1972, Ser. No. 231,348
Int. Cl. G01n 1/10, 1/14
U.S. Cl. 23—253 R                    10 Claims

ABSTRACT OF THE DISCLOSURE

An elongated sample solution cup has a cross section adapted to inducing turbulence in a solvent stirred in the cup, and has an offset recessed bottom cavity providing a localized dissolver volume for solid samples introduced into the cup. A removable filter tube provides a filtered sample solution for further wet analysis. The reactor module comprising the solution cup and the removable filter tube is made of a thin wall thermoplastic material, suitable for using one or more times.

CROSS-REFERENCES TO RELATED APPLICATIONS

This application is related to the following applications, all assigned to the same assignee as the present application:

Ser. No. 177,555 for Tablet Disruptor Device, by Donald G. Rohrbaugh and Everett J. Petersen, Jr., filed Sept. 18, 1971; and the following applications filed herewith, Ser. No. 231,350 for Chemical Analysis Tube Module by Donald G. Rohrbaugh;

Ser. No. 231,268 for Chemical Analysis Sample Dissolver Module by Donald G. Rohrbaugh, Everett Petersen, Jr., and C. P. Chase;

Ser. No. 231,353 for Chemical Analysis Rotary Module by Donald G. Rohrbaugh and William R. Pearson; and Ser. No. 231,351 for Automated Chemical Analyser System by Donald G. Rohrbaugh, William R. Pearson, Everett Petersen, Jr., and C. P. Chase.

BACKGROUND OF THE INVENTION

The chemical sample reactor module of this invention is particularly useful in automated chemical analysis requiring wet analysis of solid chemical samples which must be dissolved in solvent. At an early step in the automated analysis, it is necessary to dissolve a widely different variety of chemical substances such as capsules, tablets, powders, and the like in a solvent such as water. To maintain a high degree of precision and accuracy in repetitive chemical analysis, it is required that the successive samples of a chemical composition be quickly and completely dissolved in the solvent, prior to beginning a series of wet chemical reactions in the automated chemical analysis procedure.

Ferrari and Kline have disclosed in U.S. Pat. No. 3,223,485 an automated apparatus for analyzing solids. The apparatus embodies a multiplicity of simple cup containers, each of which receives a solid sample for analysis. Each separate solid sample in the automated line of cup containers is separately successively emptied into a single mixing and dissolving mechanism, which separately dissolves each solid sample and provides a take-off means for removing a sample solution, then returning the single mixing component to a clean condition for analyzing another incoming solid sample. As the result of using a single mixing mechanism, the assembly is subjected to inter sample contamination and rate of solution problems which add to the errors in precision for rapid chemical analysis procedures.

Another U.S. Pat. No. 3,223,486 to Holl and Walton also discloses an apparatus for treating solids for chemical analysis. This invention also provides a single sample solution mixing and aliquot analysis sample volume, which is likewise subject to the slow rate of solution of samples and the contamination resulting from each succeeding solid sample being dissolved in the same mixing mechanism.

A Canadian patent, Pat. No. 868,484 issued to Rochte, Martin, Hoffa, and Moore, discloses an automated chemical analyzer using the sample capsule and filtering mechanism further taught in U.S. Pat. No. 3,540,856 of Rochte and Hoffa. In the latter invention a sample capsule has a cup of special form in which a precipitate is formed and a filter cup with a filter paper bottom is placed atop the precipitate. The mechanism provides for automatically dropping the filter cup into the capsule and applying a vacuum to the cup, drawing clear filtrate sample through the filter paper into the cup, suitable for further analytical processing procedure.

SUMMARY OF THE INVENTION

A thin wall thermoplastic chemical sample reactor module has an elongated sample solution cup. The solution cup has a cross section inducing turbulence in a liquid stirred in the cup, together with an off-set recessed bottom cavity formed in the cup bottom which is suitable for receiving a chemical sample. The bottom cavity is bisectingly disposed on the first end of a line bisecting the cup cross section. A removable filter tube assembly having a uniform tubular cross section is disposed in the cup parallel to the cup depth. The filter first open tube terminus is disposed adjacent the cup bottom and the filter second tube terminus is adjacent the cup top aperture. The filter second tube terminus is integrally secured to a filter support plate, which is in turn removably secured to index means affixing together the support plate and the wall of the cup top aperture, the first tube terminus being disposed offset from the bottom cavity. The removable filter tube assembly is also an integral thin wall thermoplastic material. The cup cross section is preferably a trapezium, and the cup bottom cavity is preferably a hemispherical shape.

Other aspects and advantages of this invention are taught in the following description and claims.

BRIEF DESCRIPTION OF THE DRAWINGS

The description of this invention is to be read in conjunction with the following drawings.

DESCRIPTION OF THE PREFERRED EMBODIMENT

Figure 1:
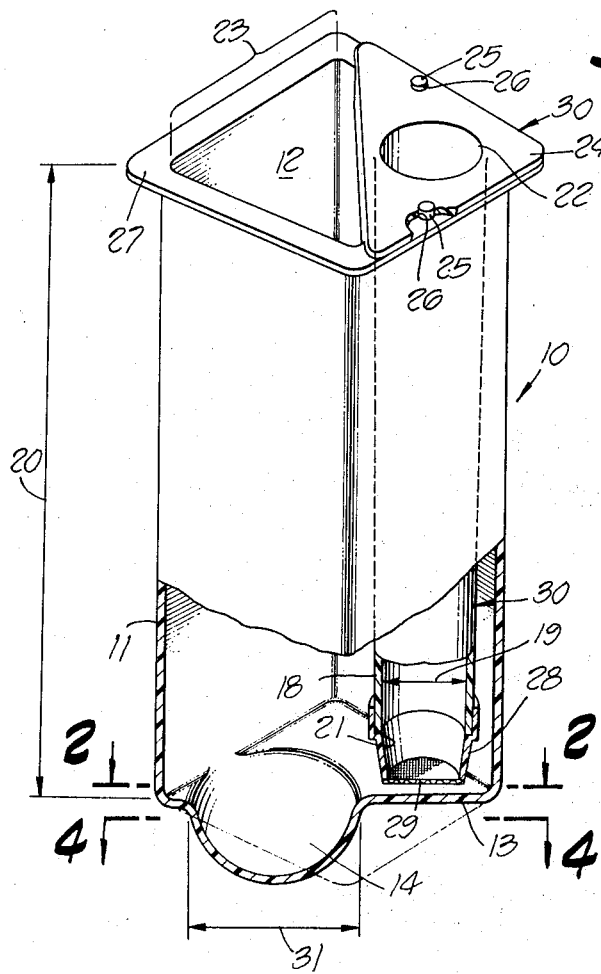
FIG. 1 is a perspective elevation and partial sectional view of the sample reactor module of this invention including the sample solution cup and the filter tube assembly.
Figure 3:
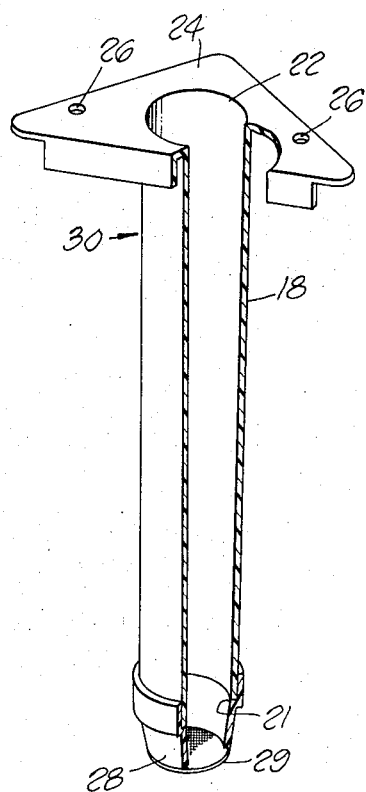
FIG. 3 is a perspective partial sectional view of the filter tube assembly shown positioned for use in FIG. 1.
Figure 2:
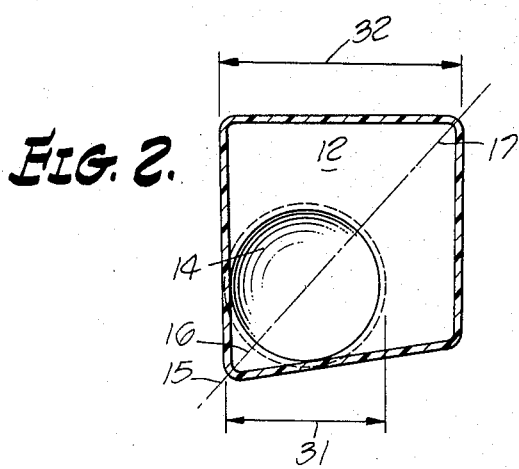
FIG. 2 is a cross sectional view through 2—2 of FIG. 1.

Referring to FIGS. 1 and 2 together in detail, the sample reactor module 10 is shown in elevational perspective view, having a sample solution cup 11 and a filter tube subcombination 30 disposed in the cup 11. The sample solution cup 11 is shown in cup cross section 12 in FIG. 2, the cross section being a geometrical trapezium. The cup bottom 13 of the elongated cup has a recessed hemispherical shaped bottom cavity 14 which is disposed off-set at a first end 16 of a bisecting line of cross section 15 of the cup bottom 13. A filter tube subcombination 30 is shown secured off-set in the cup 11 near the second end 17 of the bisecting line 15. The filter tube 18 shown in partial sectional view has a uniform filter tube cross section 19. The filter tube 18 extends substantially over the cup depth 20 to a first open tube terminus 21 and terminates at a second open tube terminus 22 at the cup top aperture 23. The thin wall thermoplastic triangular shaped support plate 24 is integrally secured to the tube terminus 22. An index means, comprising the pair of oppositely disposed index pins 25 secured on the cup lip 27, and the oppositely disposed pair of mating index apertures 26, secure the filter tube subcombination 30 in the solution cup 11, forming the sample reactor module 10. A removable filter hat unit 28 is secured to the first open tube terminus 21, and has a filter paper 29 integrally secured in the filter hat 28, providing a filtering means for securing filtered solution for further chemical analysis procedure. The filter paper 29 can also be integrally secured to the first open tube terminus 21, thereby eliminating the filter hat 28.

The recessed bottom cavity 14 has a cavity diameter 31 disposed on the cup bottom diameter 32. The cavity diameter 31 is not substantially greater than one-half of the cup bottom dimension 32, in order to provide volume at the cup bottom 13 for the first filter tube terminus 21.

Figure 4:
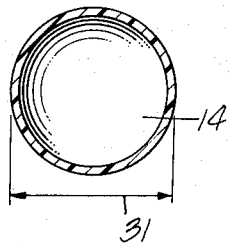
FIG. 4 is a cross sectional view through 4—4 of FIG. 1.

FIG. 4 illustrates that the bottom cavity 14 is preferably hemispherical, providing a recessed cavity into which solid samples such as a pharmaceutical tablet, a capsule, or a powdered substance can be deposited.

Figure 5:
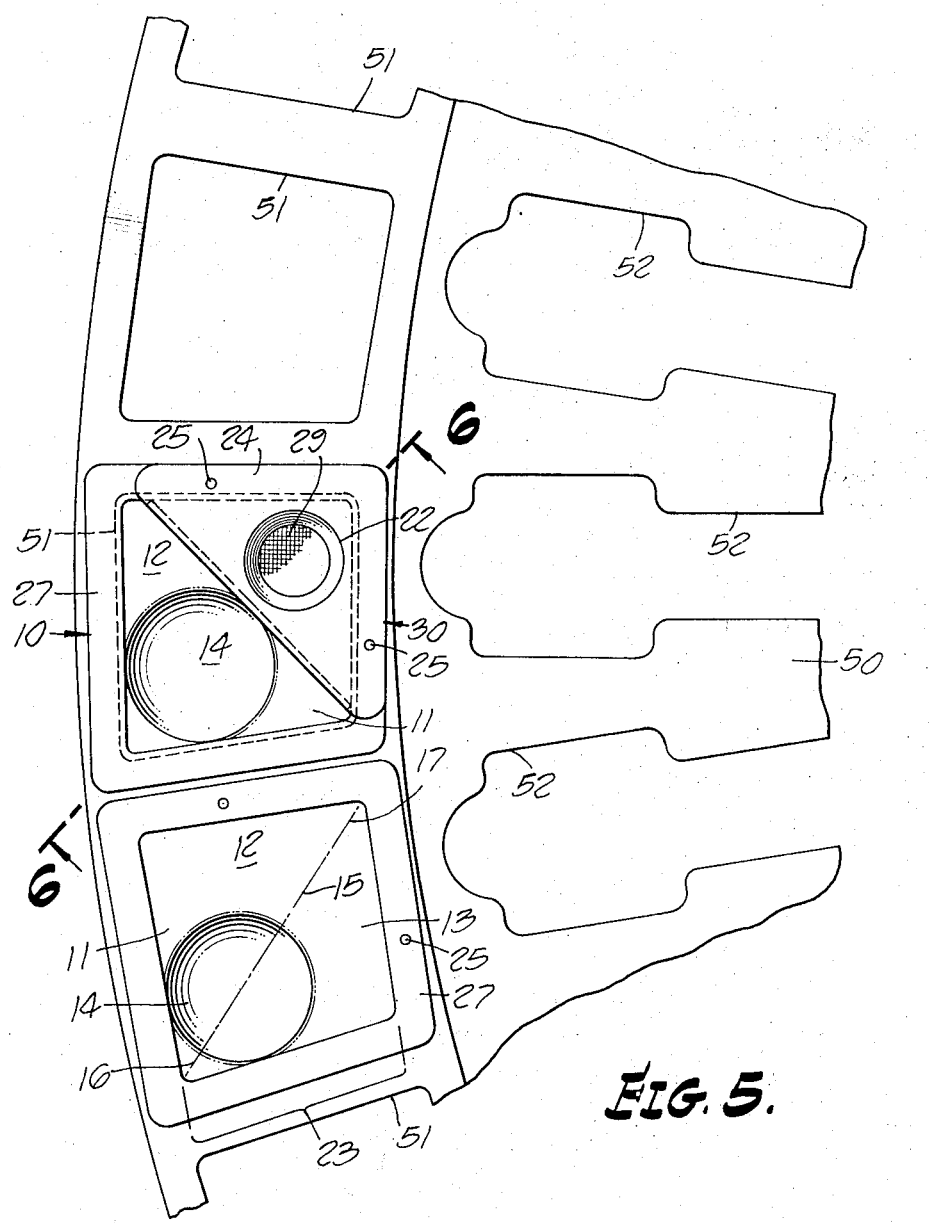
FIG. 5 is a planar view of a supporting table in an automated chemical analyzer illustrating the relative position of the sample reactor module in the analyser table, together with a configured cut-out aperture in the supporting table into which the module fits.

FIG. 5 illustrates in detail the operational position of a sample reactor module 10 disposed in an analytical chemical analysis rotary table. The chemical reactor modules 10 are disposed in apertures 51 of the rotary table 50 in serial order, providing for the serial systematic solution of solid samples in solvents prior to their chemical anlysis.

Figure 6:
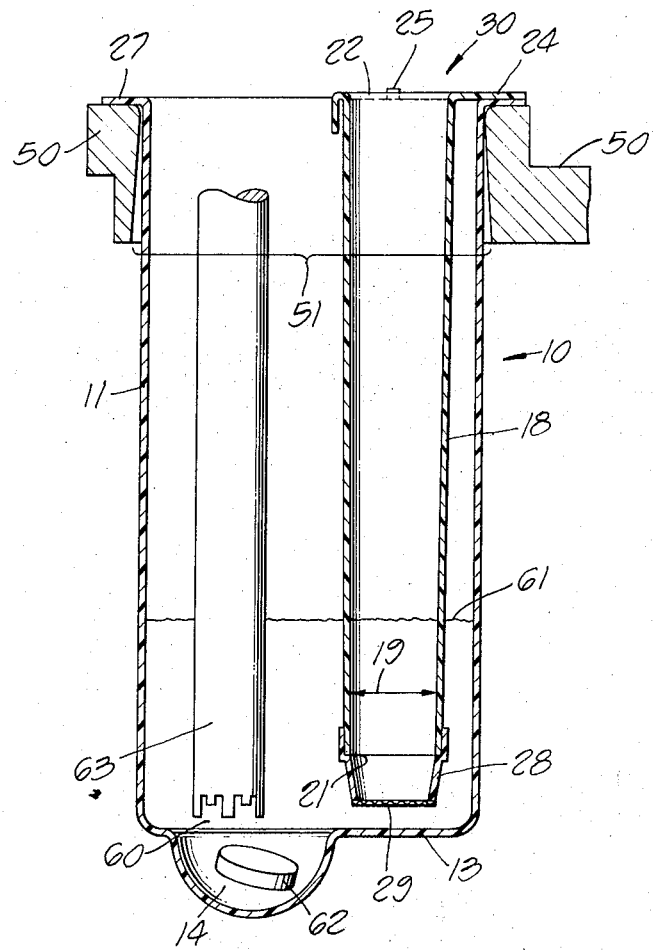
FIG. 6 is an elevational cross sectional view through 6—6 of FIG. 5, illustrating the application of the sample reactor module.

Thus in FIG. 6 a sample reactor module 10 is shown disposed in operational position in an aperture 51 of table 50. The solvent 60 is shown disposed in the solution cup 11 to the solvent top level 61. A sample solid tablet 62 is shown positioned in the recessed hemispherical cavity 14 just below a tablet disrupter and dissolver device 63. On signal the disrupter and dissolver device 63 operates, physically disintegrating the tablet 62 if necessary, as well as to stir the solvent 60, accelerating the rate of solution of the substances in tablet 62, so that the substances can be analyzed. Additionally, the confinement of the solid particles in the cavity 14 minimizes the loss of solid particles on stirring to the upper sides of the solution cup 11, where the solid particles cannot be reached for further solution process.

The trapezium cross section 12 illustrated in FIG. 2 induces turbulence in the solvent 60 during the stirring and solution process. The unequal length four-sided trapezium provides a high degree of liquid turbulence when the device 63 operates, minimizing the deposition of a characteristic solid material deposit at the top of the solvent line, the solvent turbulence preventing the formation of an even solvent top level 61. Although FIG. 2 specifically illustrates a trapezium shaped cross section 12, other cup cross sections can be equivalent to the cross section 12, providing they induce a high degree of solvent turbulence on stirring. It is the specific function of the cup cross section 12 and its equivalent cross sectional shapes to provide discontinuities for the solvent circular vortex induced by the device 63. These discontinuities break the vortex, producing additional solvent blending with the sample solids, and also produce a more turbulent solvent recirculation. Other irregular polygon shaped cross sections are equivalent to cross section 12 as well as regular polygon shaped cross sections, can be utilized.

The volume of a sample cup 11 is the value necessary to produce effective tablet, capsule, or the like disruption and solution typically in 25 to 100 ml. of solvent. Additional cup depth 20 can be provided to accommodate the increased liquid height and the droplet splash of the turbulent solvent during solid disruption and solution. The hemispherical shaped recessed cavity 14 disposed at one end 16 of the bisector line 15 provides a cup volume adjacent to which the device 63 can be inserted for the efficient grinding and solution of the tablet 62 or the like. The device 63 is spaced directly above the recessed cavity 14, thus concentrating the device's grinding and mixing potential.

Typically the sample reactor module 10 can be injection molded, as a thin wall cup and a thin wall filter tube unit made of polypropylene, high density polyethylene, styrene, polycarbonate, and the like. It is intended that the module 10 be used one or more times as are desirable and then be discharged. In view of the public need for repetitiously analyzing large numbers of a great variety of complex chemical compositions, pharmaceutical and food products, it becomes necessary to devise automated means for analyzing these products. This invention provides a distinct inventive advance in the art of preparing a solid substance for further automated chemical analysis.

Obviously many modifications and variations in the improvement in the sample reactor module can be made in the light of the above illustrated embodiment and teachings. It is therefore understood that within the scope of the appended claims, the invention may be practiced otherwise than as specifically described.

I claim:

1. In a thin wall thermoplastic chemical sample reactor module, the combination comprising:
   an elongated sample solution cup having a cup cross section inducing turbulence in a liquid stirred in said cup,
   a recessed bottom cavity formed in the cup bottom suitable for receiving a chemical sample, said cavity bisectingly disposed on the first end of a line bisecting said cup cross section, and
   a removable filter tube of uniform tubular cross section disposed in said cup parallel to the cup depth, the filter first open tube terminus disposed adjacent said cup bottom, and the filter second tube terminus integrally secured to a support plate which is removably secured to index means affixed to said support plate and the wall of said cup top aperture, said first tube terminus being offset from said bottom cavity.

2. A chemical sample reactor module as set forth in claim 1 wherein said bottom cavity is a hemispherical shape.

3. A chemical sample reactor module as set forth in claim 1 wherein said cup cross section is an irregular polygon cross section.

4. A chemical sample reactor module as set forth in claim 1 wherein said cup cross section is a regular polygon cross section.

5. A chemical sample reactor module as set forth in claim 1 wherein said cup cross section is a trapezium cross section.

6. A thin wall thermoplastic chemical sample reactor module combination comprising:
   an elongated sample solution cup having a cup cross section inducing turbulence in a liquid stirred in said cup,
   a recessed bottom cavity formed in the cup bottom suitable for receiving a chemical sample, said cavity bisectingly disposed on the first end of a line bisecting said cup cross section,
   a support lip secured to the perimeter of the top aperture of said cup,
   a pair of index means disposed on said lip, each one means of said pair bisectingly oppositely secured across said line bisecting said cup cross section, and a removable filter tube of uniform tubular cross section disposed in said cup parallel to the cup depth, the filter first open tube terminus disposed adjacent said cup bottom, and the filter second tube terminus adjacent said cup top aperture, said second tube terminus integrally secured to a support plate which is removably secured to said pair of index means.

7. A chemical sample reactor module as set forth in claim 6 wherein said bottom cavity is a hemispherical shape.

8. A chemical sample reactor module as set forth in claim 6 wherein said cup cross section is an irregular polygon cross section.

9. A chemical sample reactor module as set forth in claim 6 wherein said cup cross section is a regular polygon cross section.

10. A chemical sample reactor module as set forth in claim 6 wherein said cup cross section is a trapezium cross section.

References Cited

UNITED STATES PATENTS

| | | | |
|---|---|---|---|
| 3,115,460 | 12/1963 | McCormick | 23—292 X |
| 3,627,432 | 12/1971 | Bergmann | 23—292 X |
| 3,684,453 | 8/1972 | Lartigue et al. | 23—259 X |

MORRIS O. WOLK, Primary Examiner

R. E. SERWIN, Assistant Examiner

U.S. Cl. X.R.

23—259, 292